(12) United States Patent
Bao (10) Patent No.: US 8,848,789 B2
(45) Date of Patent: Sep. 30, 2014

(54) METHOD AND SYSTEM FOR CODING AND DECODING INFORMATION ASSOCIATED WITH VIDEO COMPRESSION

(75) Inventor: Yiliang Bao, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1703 days.

(21) Appl. No.: 11/469,646

(22) Filed: Sep. 1, 2006

(65) Prior Publication Data

US 2007/0223579 A1    Sep. 27, 2007

Related U.S. Application Data

(60) Provisional application No. 60/786,799, filed on Mar. 27, 2006.

(51) Int. Cl.
| H04N 7/12 | (2006.01) |
| H04N 19/129 | (2014.01) |
| H04N 19/196 | (2014.01) |
| H04N 19/186 | (2014.01) |
| H04N 19/70 | (2014.01) |
| H04N 19/187 | (2014.01) |
| H04N 19/34 | (2014.01) |
| H04N 19/13 | (2014.01) |
| H04N 19/176 | (2014.01) |
| H04N 19/61 | (2014.01) |
| H04N 19/93 | (2014.01) |
| H04N 19/463 | (2014.01) |

(52) U.S. Cl.
CPC ... *H04N 19/00109* (2013.01); *H04N 19/00369* (2013.01); *H04N 19/00315* (2013.01); *H04N 19/00884* (2013.01); *H04N 19/00321* (2013.01); *H04N 19/00442* (2013.01); *H04N 19/00121* (2013.01); *H04N 19/00278* (2013.01); *H04N 19/00781* (2013.01); *H04N 19/00957* (2013.01); *H04N 19/00551* (2013.01)
USPC ..................................................... 375/240.12

(58) Field of Classification Search
USPC .................. 375/240, 240.01, 240.12, 240.16, 375/240.18; 717/136, 141; 341/63; 348/557
See application file for complete search history.

(56) References Cited

U.S. PATENT DOCUMENTS

| 6,124,811 A * | 9/2000 | Acharya et al. ................. 341/63 |
| 2002/0025000 A1 | 2/2002 | Takeuchi et al. |

(Continued)

FOREIGN PATENT DOCUMENTS

| EP | 1156680 | 11/2001 |
| EP | 1711018 | 10/2006 |

(Continued)

OTHER PUBLICATIONS

ISR-PCT-US2007-065294, mailed Jan. 24, 2008.

(Continued)

*Primary Examiner* — Allen Wong
(74) *Attorney, Agent, or Firm* — Brent A. Boyd (57) ABSTRACT

A method and system for coding and decoding information associated with video impression is described. The video sequence is processed in a plurality of frames. Each frame of the plurality of frames is processed in a plurality of macroblocks. A prediction of an original video signal, which is a part of a macroblock, in a current frame, is constructed from the video sequence. A residual signal is formed by subtracting the prediction of the original video signal from the original video signal in the current frame. A transform to the residual signal is applied. A plurality of transform coefficients is quantized. A symbol of at least one syntax element that defines a characteristic of the residual signal is identified. Symbols of the at least one syntax element of a same category are coded together.

26 Claims, 7 Drawing Sheets

(56) References Cited

U.S. PATENT DOCUMENTS

| | | | |
|---|---|---|---|
| 2003/0156648 A1* | 8/2003 | Holcomb et al. | 375/240.18 |
| 2003/0179940 A1 | 9/2003 | Lin et al. | |
| 2004/0013194 A1 | 1/2004 | Piche et al. | |
| 2004/0268329 A1* | 12/2004 | Prakasam | 717/141 |
| 2005/0066318 A1* | 3/2005 | Chujoh et al. | 717/136 |
| 2005/0254583 A1 | 11/2005 | Kim et al. | |
| 2006/0008009 A1 | 1/2006 | Bao et al. | |
| 2006/0013302 A1 | 1/2006 | Bao et al. | |
| 2006/0039620 A1 | 2/2006 | Chen et al. | |
| 2006/0146191 A1* | 7/2006 | Kim et al. | 348/557 |
| 2006/0233254 A1* | 10/2006 | Lee et al. | 375/240.16 |

FOREIGN PATENT DOCUMENTS

| | | | |
|---|---|---|---|
| JP | 2005513883 A | 5/2005 | |
| JP | 2005523658 A | 8/2005 | |
| JP | 2008526119 A | 7/2008 | |
| RU | 2189120 | 9/2002 | |
| RU | 2335845 | 10/2008 | |
| WO | WO03084076 A1 | 10/2003 | |
| WO | WO03090469 A2 | 10/2003 | |
| WO | 2006069297 | 6/2006 | |

OTHER PUBLICATIONS

Yan Ye, et al., "Improvements to FGS layer Variable Length Coder," JVT 19th Meeting, Mar. 31, 2006. Geneva, Switzerland.

Jungong Han, et al., "DCT-based embedded coding scheme for stereo image." Communications, Circuits and Systems, 2004. ICCCAS 2004. 2004 International Conference on Chengdu, China Jun. 27-29, 2004. Piscataway, NJ. USE. IEEE, US Jun. 27, 2004, pp. 543-547 vol. 1.

Jan Richardson, H.264 and MPEG-4 Video coding—standards of the new generation, Moscow, Technosfera,2005, pp. 67-68, 269-273.

Joint Video Team (JVT) of ISO/IEC MPEG & ITU-T VCEG, CE7 Report, Multiple FGS layer coding for low-delay applications, JVT-R077, 18th Meeting, Jan. 14, 2006, Bangkok.

Joint Video Team (JVT) of ISO/IEC MPEG & ITU-T VCEG, Extended Spatial Scalability with picture-level adaptation, JVT-O008, 15th Meeting: Busan, Apr. 16-22, 2005, pp. 1-20.

Taiwanese Search report—096110566—TIPO—Jun. 1, 2010.

ITU-T Recommendation, H.264—Telecommunication Standardization Sector of ITU; Series H: Audiovisual and Multimedia Systems Infrastructure of audiovisual services—Coding of moving video; "Advanced video coding generic audiovisual services", pp. 1-343, Mar. 2005.

Wiegand, Thomas, et al., "Joint Draft 5: Scalabie Video Coding", Document JVT-R 201, pp. 1-522, Jan. 2006, 18th Meeting—Bangkok, Thailand.

Written Opinion—PCT/US07/065294—International Search Authority, European Patent Office—Jan. 24, 2008.

International Preliminary Report on Patentability—PCT/US/065294—The International Bureau of WIPO, Geneva. Switzerland—Sep. 30, 2008.

Hiroshi Yasuda et al. (translated by), Digital Broadcasting and Internet Data Compression Techniques, 1st edition, Kyoritsu Shuppan Co., Ltd., Jun. 10, 1999, No. 125-139, and 248-257, ISBN: 4-320-02936-4.

M. Nelson, et al. (written by), Tsuyoshi Hagiwara et al. (translated by), The Data Compression Handbook (Revised Second Edition), 1st edition, Kabushiki Kaisha Toppan, Oct. 20, 1996, p. 455, ISBN: 4-8101-8605-9.

The Handbook Committee of the Institute of Electronics, Information and Communication Engineers (edited by), Encyclopedia Handbook of Information Technology Communication, 1st edition, Kabushiki Kaisha Ohmsha, Nov. 30, 1998, pp. 210 to 211, ISBN: 4-274-03514-X.

* cited by examiner

METHOD AND SYSTEM FOR CODING AND DECODING INFORMATION ASSOCIATED WITH VIDEO COMPRESSION

RELATED APPLICATIONS

This application claims priority to co-assigned U.S. Provisional Patent Application Ser. No. 60/786,799 filed Mar. 27, 2006, for "Method and Apparatus for Efficient Coding of Syntax Elements in Video Compression," which is incorporated herein by reference.

TECHNICAL FIELD

The present systems and methods relate generally to video processing. More specifically, the present systems and methods relate to encoding and decoding information relating to video compression techniques.

BACKGROUND

Video compression refers to compression of digital video data. Video compression is used for efficient coding of video data in video file formats and streaming and broadcasting video formats. Compression is a conversion of data to a format that has fewer bits, which may be stored or transmitted more efficiently. The inverse of compression is decompression, which produces a replica of the original data.

Today, some video compression methods apply a certain type of discrete transform such as Discrete Cosine Transform (DCT) for reducing remaining spatial redundancy in a prediction residual, which is generated using either temporal or spatial prediction techniques. Some video compression techniques also involve quantization. Quantization can either be scalar quantization or vector quantization. After quantization, quantized coefficients may be entropy coded and placed into a compressed video bit stream. The compressed bit stream is then sent to a video decoder, which will decompress the bit stream and recover a close approximation of the original video data Video compression techniques may benefit consumers of various forms of media. For example, in broadcast engineering, digital television may be made practical by video compression. Television (TV) stations can broadcast High-Definition television (HDTV) multiple virtual channels on the same physical channel. Digital video broadcast may use the Moving Picture Experts Group (MPEG) standard, such as the MPEG-2 standard video compression format. However, H.264/MPEG-4 and VC-1 are beginning to emerge as new standards in video compression.

Unfortunately, known systems and methods for coding information in video compression may suffer from various drawbacks. Accordingly, benefits may be realized by improved systems and methods for coding information in video compression.

DETAILED DESCRIPTION

A method and system for coding information associated with video compression is described. The video sequence is processed in a plurality of frames. Each frame of the plurality of frames is processed in a plurality of macroblocks. A prediction of an original video signal, which is a part of a macroblock, in a current frame, is constructed from the video sequence. A residual signal is formed by subtracting the prediction of the original video signal from the original video signal in the current frame. A transform to the residual signal is applied. A plurality of transform coefficients is quantized. A symbol is identified of at least one syntax element that defines a characteristic of the residual signal. Symbols of the at least one syntax element of a same category are coded together.

A coded block pattern may be coded. The coded block pattern may be coded as runs of zeros and runs of nonzero values. The coded block pattern may be coded as only runs of zeros. An initial value symbol may be encoded to indicate the initial value of the coded runs of zeros and runs of nonzero values. A transition symbol may be inserted to indicate how the value of a symbol in a current run changes to the value of a symbol in a next run of symbols of the at least one syntax element. A maximum run length may be defined of the symbols of the at least one syntax element to be coded.

A macroblock skip symbol may be coded. A macroblock type symbol may be coded. A delta quantization parameter symbol may also be coded.

The symbols of the at least one syntax element may be scanned in multiple patterns. A skip flag bit may be defined and the coding of a particular set of the at least one syntax element symbols may be bypassed. The skip flag bit may be defined in an enhancement layer. The symbols of the at least one syntax element within an enhancement layer may be coded based upon the corresponding symbols of the syntax element within a base layer.

An apparatus that is configured to code information associated with video compression is also disclosed. The apparatus includes a processor and memory in electronic communication with the processor. Instructions are stored in the memory. A video sequence is received. The video sequence is processed in a plurality of frames. Each frame of the plurality of frames is processed in a plurality of macroblocks. A prediction of an original video signal, which is part of a macroblock, is constructed in a current frame from the video sequence. A residual signal is formed by subtracting the prediction of the original video signal from the original video signal in the current frame. A transform is applied to the residual signal. A plurality of transform coefficients is quantized. A symbol is identified of the at least one syntax element that defines a characteristic of the residual signal. Symbols of the at least one syntax element of a same category are coded together.

A computer-readable medium including executable instructions for coding information associated with video compression is also disclosed. A video sequence is received. The video sequence is processed in a plurality of frames. Each frame of the plurality of frames is processed in a plurality of macroblocks. A prediction of an original video signal, which is part of a macroblock, is constructed in a current frame from the video sequence. A residual signal is formed by subtracting the prediction of the original video signal from the original video signal in the current frame. A transform is applied to the residual signal. A plurality of transform coefficients is quantized. A symbol is identified of the at least one syntax element that defines a characteristic of the residual signal. Symbols of the at least one syntax element of a same category are coded together.

A method for decoding information associated with video compression is also disclosed. An encoded video sequence is received. A plurality of symbols of a same category is decoded together. A plurality of transform coefficients is dequantized. An inverse transform is applied to a residual signal. A decoded video sequence is constructed.

An electronic device that is configured to decode information associated with video compression is also disclosed. The electronic device includes a processor and memory in electronic communication with the processor. Instructions are stored in the memory. An encoded video sequence is received. A plurality of symbols of a same category is decoded together. A plurality of transform coefficients is dequantized. An inverse transform is applied to a residual signal. A decoded video sequence is constructed.

An apparatus that is configured to code information associated with video compression is disclosed. The apparatus includes a means for processing and a means for receiving a video sequence. A means for processing the video sequence in a plurality of frames and a means for processing each frame of the plurality of frames in a plurality of macroblocks is disclosed. A means for constructing a prediction of an original video signal, which is a part of a macroblock, in a current frame, from the video sequence and a means for forming a residual signal by subtracting the prediction of the original video signal from the original video signal in the current frame is disclosed. A means for applying a transform to the residual signal and a means for quantizing a plurality of transform coefficients is disclosed. A means for identifying a symbol of at least one syntax element that defines a characteristic of the residual signal and a means for coding symbols of the at least one syntax element of a same category together is also disclosed.

Various features of the systems and methods are now described with reference to the Figures, where like reference numbers indicate identical or functionally similar elements. The features of the present systems and methods, as generally described and illustrated in the Figures herein, could be arranged and designed in a wide variety of different configurations. Thus, the detailed description below is not intended to limit the scope of the systems and methods, as claimed, but is merely representative of the configurations of the systems and methods.

Figure 11:
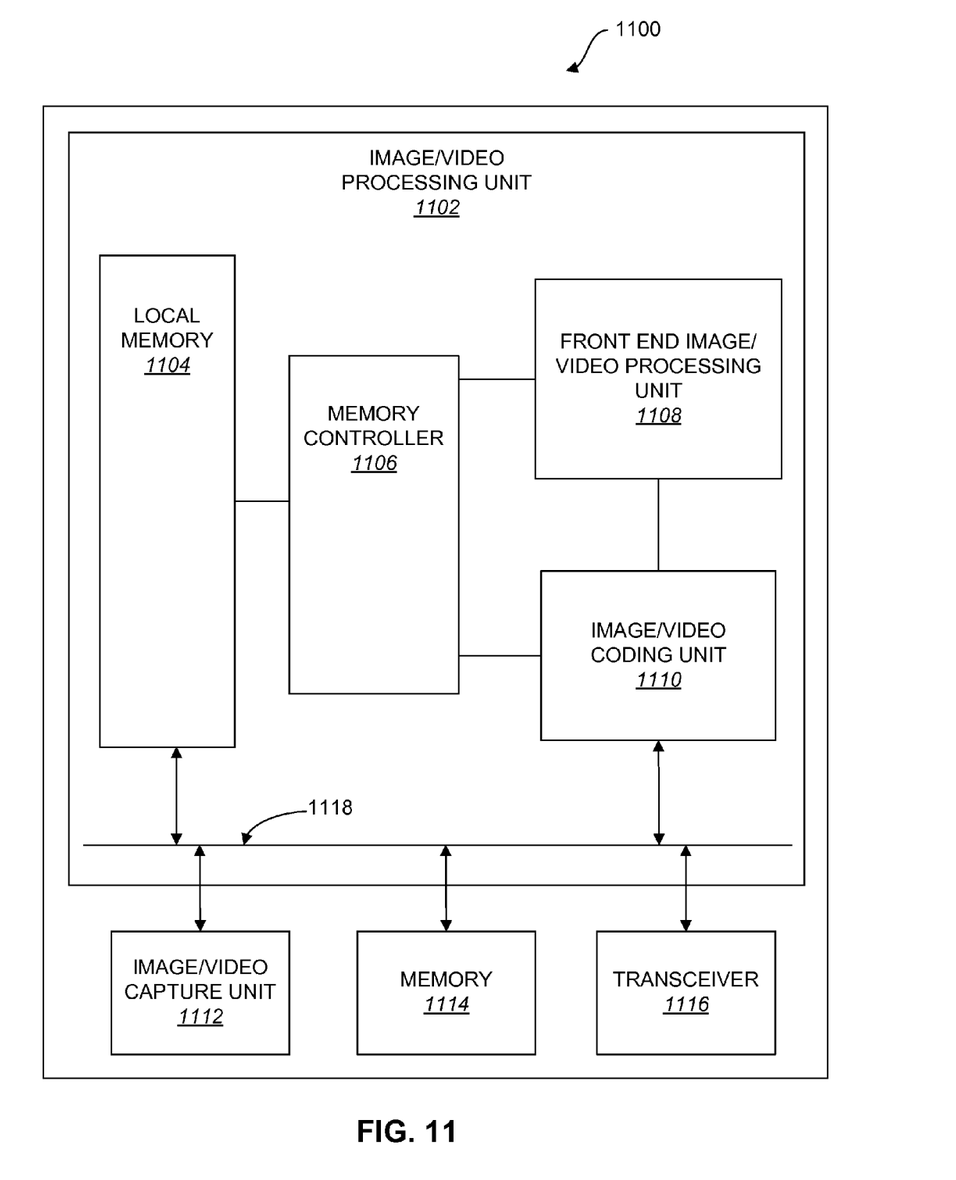
FIG. 11 is a block diagram illustrating major hardware components typically utilized to process digital images and/or digital video.

Many features of the configurations disclosed herein may be implemented as computer software, electronic hardware, or combinations of both (see FIG. 11). To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present systems and methods.

Where the described functionality is implemented as computer software, such software may include any type of computer instruction or computer/machine executable code located within a memory device and/or transmitted as electronic signals over a system bus or network. Software that implements the functionality associated with components described herein may comprise a single instruction, or many instructions, and may be distributed over several different code segments, among different programs, and across several memory devices.

In video coding, a video frame is coded hierarchically. The frame is partitioned into macroblocks. Each macroblock typically consists of a luminance block (Y) of size 16×16. A macroblock also consists of a block of chrominance Cb and a block of chrominance Cr. The size of the chrominance block depends on the color format. For the YCbCr420 color format, the size of each chrominance block is 8×8. For purposes of this application, the video is coded in YCbCr color space with format YCbCr420. However, the present systems and methods may be applied to video coding in other color spaces and color formats as well.

In a video encoder, after typical video compression processes, such as prediction, transform, and quantization, the next step is to perform entropy coding on syntax elements and quantized coefficients to form a bitstream. In a video decoder, an inverse process is performed. Syntax elements and the quantized coefficients are decoded from the bitstream. Then inverse quantization and inverse transform are performed. Finally, a reconstructed residual is added to a prediction to reconstruct the video signal.

One example of a syntax element is a coded block pattern (CBP). The CBP indicates whether there are any nonzero quantized coefficients in the macroblock and how they are distributed at the block level. Under the H.264/Advanced Video Coding (AVC) standards, unless a macroblock is skipped by the encoder, both luma CBP and chroma CBP are sent in the bitstream. Luma CBP consists of four bits with one bit corresponding to each of four 8×8 blocks. If a luma CBP bit is zero, it means the corresponding 8×8 block does not have any nonzero coefficients. So luma CBP may have a value from 0 to 15, and chroma CBP may have a value from 0 to 2. The macroblock CBP is formed from the luma CBP and the chroma CBP and is mapped to a code number. The code number is coded using, for example, Exponential Golomb code and then added to the bitstream. However, this coding method may not be optimal, since correlation among the Coded Block Patterns of the neighboring macroblocks is not exploited because each macroblock CBP is sent independently.

Currently a Joint Video Team (JVT), which consists of video coding experts from ISO/IEC MPEG and ITU-T VCEG, is working on a Scalable Video Coding (SVC) extension to H.264/AVC. The latest development put forth by the JVT is to allow a bitstream that has coarse Signal-to-noise (SNR) scalability, fine granularity SNR scalability (FGS), spatial scalability, and temporal scalability. In the coarse SNR scalability and spatial scalability layer, the luma CBP and the chroma CBP are coded in the same way as they are coded in the base layer, thus these layers possess similar problems as those in the base layer.

In the FGS layer, one way of coding the luma coded block pattern is to separate four luma CBP bits within a macroblock into two groups based on the luma CBP in the base layer. The luma CBP bits in the enhancement layer (Type-0 CBP bits), whose corresponding luma CBP bits in the base layer are zero, are coded separately from the luma CBP bits in the enhancement layer (Type-1 CBP bits), whose corresponding luma CBP bits in the base layer are nonzero. Based on the value of luma CBP in the base layer, the number of Type-0 bits and Type-1 bits may not be fixed from one macroblock to another macroblock. One technique is to encode either Type-0 or Type-1 bits using fix-length code if the number of bits in a group is less than three. If the number of bits in a group is equal to or larger than three, variable length coding (VLC) may be used. Also, this coding scheme requires the probability of CBP bits to be maintained because the VLC table used for coding either Type-0 and Type-1 bits is selected based on the current probability estimation. This coding scheme was in an earlier version of Scalable Video Coding (SVC).

A problem with such a coding scheme for syntax elements, such as the luma CBP in the FGS layer, is its complexity. Operations such as grouping luma CBP bits, maintaining probability models, and selecting VLC tables may involve extensive computation. The coding efficiency may be low because the correlation among the similar syntax elements in the neighboring macroblocks is not exploited.

Figure 1:
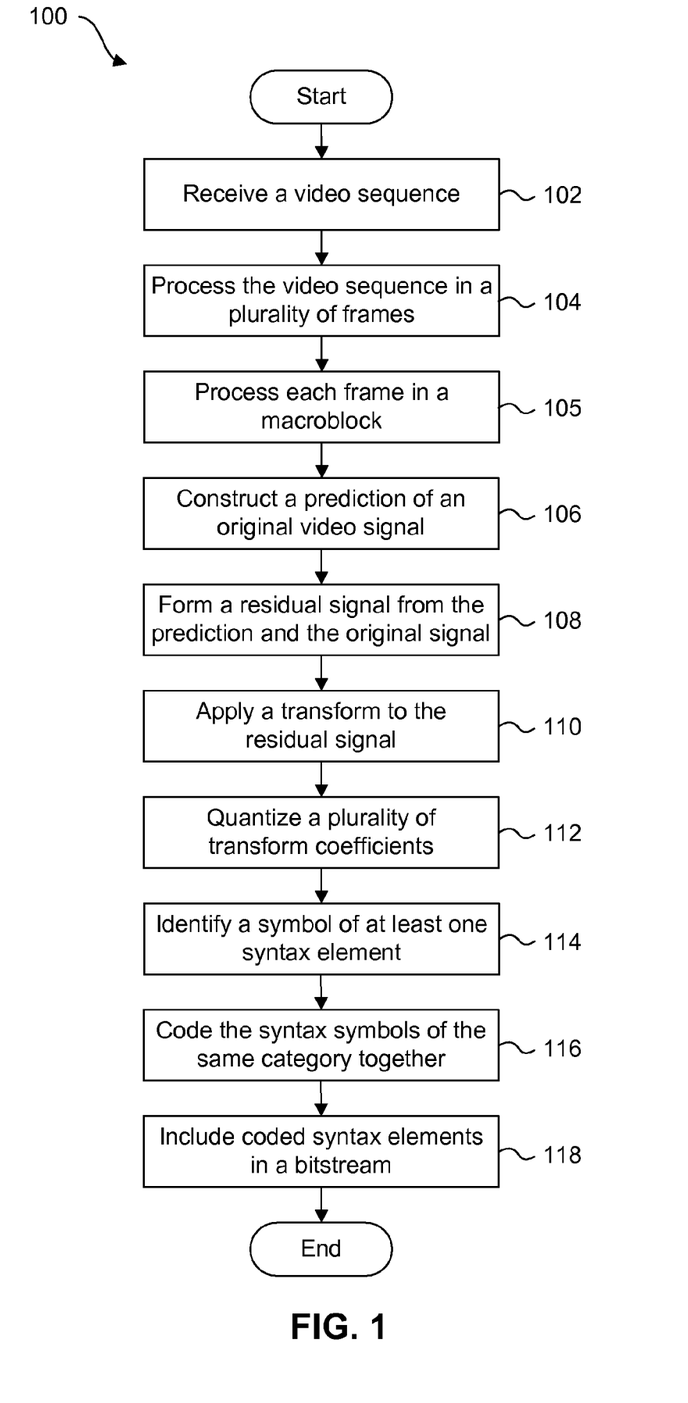
FIG. 1 is a flow chart illustrating a method for encoding information.

FIG. 1 is a flow chart illustrating a method 100 for encoding information. In one aspect, the information to be encoded comprises a video sequence. The method 100 may be carried out within a video encoder, and the inverse of the method 100 may be executed by a video decoder. An encoder is a device used to change a signal or data into a coded stream. The decoder may then produce a reconstructed version of the original signal or data from the code. In lossless compression, the reconstructed version of the original signal or data is identical to the original signal or data. In lossy compression, the reconstructed version of the original signal or data is an approximation of the original signal or data. The encoder and decoder may be collectively referred to as a video CODEC which encodes a source image or video sequence into a compressed form and decodes the compressed form to produce a copy or approximation of the source sequence. In the present description, some aspects of certain configurations are described from the point of view of an encoder. It could be easily understood by those skilled in the art of video compression that a decoder may perform inverse processes to reconstruct the signal or data encoded by the encoder.

The method 100 begins with the encoder receiving 102 the video sequence. The video sequence is processed 104 into a plurality of frames. Each frame within the plurality of frames is further processed 105 in a plurality of macroblocks. The encoder begins to compress the video sequence by exploiting similarities between neighboring video frames or between pixels in the same frame to construct 106 a prediction of the original video signal, which is a part of a macroblock in the current video frame. If the prediction is formed from one or more previous or future frames, this is referred to as temporal prediction. If the prediction is formed from the pixels in the same frame, this is referred to as spatial prediction. A residual signal is then formed 108 by subtracting the prediction signal from the signal being encoded.

The method 100 continues by applying 110 a transform to the residual signal to reduce remaining spatial redundancy. The transform converts the prediction residual samples into another domain in which they are represented by transform coefficients. The coefficients are quantized 112 to remove insignificant values, leaving a small number of significant coefficients that provide a more compact representation of the residual signal.

After prediction, transform, and quantization, the encoder identifies 114 a symbol of at least one syntax element that defines a characteristic of the residual signal. For example, the syntax element may include a coded block pattern which indicates whether or not nonzero coefficients exist in a macroblock after the quantization of the residual signal.

Figure 2:
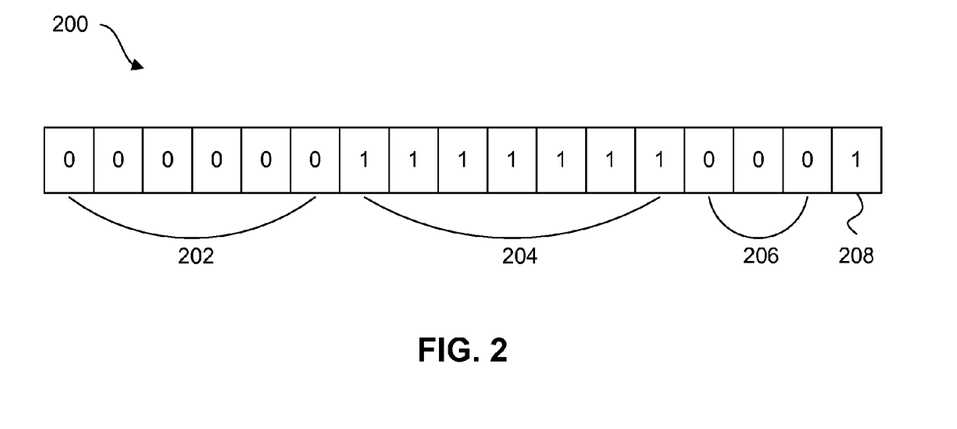
FIG. 2 is one configuration of a string of binary symbols that may be compressed using Alternating Run Length coding.

The encoder codes 116 the identified symbols of the syntax elements of a same category together. In one aspect, an entropy encoder performs entropy coding. The entropy encoder converts the series of symbols representing the syntax elements of the video sequence and includes 118 them into a compressed bitstream suitable for transmission or storage. Examples of the syntax elements may include mb_skip_flag (indicates whether a macroblock is to be skipped by the encoder; if the macroblock is skipped, the decoder will derive the motion vector(s) from those in the neighboring macroblocks and set all quantized coefficients for the macroblock to 0), mb_type (determines whether the macroblock is coded in intra or inter mode; determines macroblock partition size), sub_mb_type (determines sub-macroblock partition size for each sub-macroblock), coded_block_pattern (identifies how the nonzero transform coefficients are distributed), mb_qp_delta (changes the quantizer parameter), and residual (coded quantized transform coefficients corresponding to the residual samples after prediction).

The method 100 codes 116 the syntax element symbols of the same category together and includes 118 the coded information in a bitstream. In one configuration, the encoder codes multiple syntax elements of the same category together. For example, under the H.264 standard for video coding and the entropy coding mode is Context-based Adaptive Variable Length Coding (CAVLC), instead of sending an mb_skip_flag for each individual macroblock, a syntax element mb_skip_run is used. If mb_skip_run has a value of "n," there are "n" skipped macroblocks followed by one macroblock that is not skipped. This information is conveyed by including the Exponential Golomb Code of the unsigned number "n" in the compressed bitstream. The definition of the Exponential Golomb code may be found in section 9.1 of the H.264/AVC specification. A further example of the entropy encoder coding multiple syntax elements of the same category together is illustrated in FIG. 2.

FIG. 2 is one configuration of a string of binary symbols 200 that may be compressed as using Alternating Run Length coding in accordance with the method described in FIG. 1. As illustrated, the string 200 includes a run of six consecutive zeros 202, seven ones 204, three zeros 206, and a single one 208. The run of six zeros 202 is grouped together to provide a run-length R=6. R may then be encoded by the entropy encoder. In one aspect, "R-1" is encoded using an Exponential Golomb code, since minimal value of R is 1 and by the convention in H.264/AVC, Exponential Golomb code is used to encode non-negative numbers starting from 0. For example, R of value "6" may be encoded using the Exponential Golomb code as "00110." The run of seven consecutive ones 204 is grouped together to provide the run-length R=7. This run-length is then encoded by the entropy encoder using an Exponential Golomb code as "00111." The run of three zeros 206 and the run including the single one 208 are also encoded in a similar manner. The string of binary symbols 200 is compressed into a bitstream consisting of "00110 00111 011 1." This bitstream may then be read by the decoder to reproduce the string of binary symbols. In the decoder, the symbol "S" decoded from the bitstream can be converted to run-length R, using the equation R=S+1.

As FIG. 2 illustrates, runs of zeros are encoded together as well as runs of nonzero values. In one configuration, the entropy encoder encodes the run-length using the Exponential Golomb code. In a second configuration, the run-length may be coded in a variable length code of a different type or even encoded using another coding scheme.

For Alternating Run Length coding, as described in FIG. 2, an initial value may be coded to help derive the value of binary symbols coded in the first run. In one configuration, the initial value is set to be equal to the inverse of the binary symbol to be coded in the first run. For example, if the binary symbol to be coded in the first run is 0, the initial value is set to be 1. Coding an initial value is useful because in the decoding process of syntax elements, the value of binary symbols are changed each time a new run is decoded. Following the example provided in FIG. 2, the initial value to be coded is 1. When the decoder detects the new run of six symbols 202 after the initial value, the value of the syntax element is changed from the initial value of 1 to 0, and the decoder decodes the six values as zeros. Upon detecting the new run of seven symbols 204, the value of the syntax element is changed from 0 to 1, and the decoder decodes the run of seven values as ones. This process continues until the decoder does not detect additional runs of symbols to decode.

Figure 3:
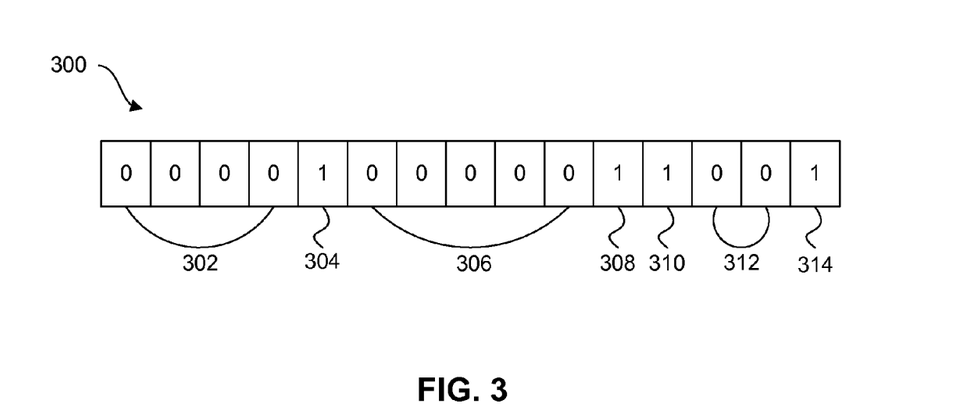
FIG. 3 is an additional configuration of a coding scheme that may be used in accordance with the present systems and methods.

FIG. 3 is another aspect of a coding scheme that may be used in connection with the method described in FIG. 1. This additional aspect may be referred to as Zero Runs coding. This scheme has been used in H.264/AVC in coding mb_skip_flag flags. As illustrated in FIG. 3, a string of binary values 300 are to be compressed. Using Zero Runs coding, only the run of the zeros before a nonzero value is coded. In one configuration, the Exponential Golomb code is used to code a zero run. As illustrated, there are four zero values 302 before a first nonzero value 304. The four zeros 302 and the first nonzero value 304 are assigned the value "4," which is coded as "00101" using Exponential Golomb code. This code is then added to the bitstream. The following five zeros 306 followed by a second nonzero value 308 are assigned the value "5" and are coded as "00110" using Exponential Golomb code. This code is similarly added to the bitstream to be sent to the decoder. As illustrated, a third nonzero value 310 follows immediately after the second nonzero value 308. The third nonzero value 310 is assigned the value of "0," which may be coded as a "1" using Exponential Golomb code and added to the bitstream. The remaining two zeros 312 followed by a fourth nonzero value 314 are assigned the value "2" and are coded as "010" using Exponential Golomb code. The resulting bitstream sent to the decoder is "00101 00110 1 01 1." The Zero Runs coding as illustrated in FIG. 3 does not require an initial flag value to be sent in the bitstream.

Figure 4:
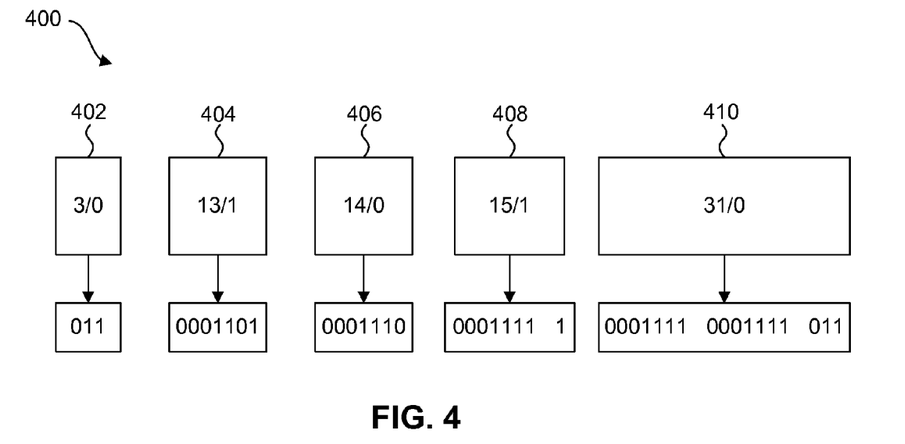
FIG. 4 is a block diagram illustrating one configuration of limiting a run length that is encoded.

FIG. 4 illustrates one configuration 400 of limiting the run length that is to be encoded. For video of high resolution, the maximal run length for some syntax elements may be extremely long. For example, for video with the resolution of 1920×1080, the maximal run length for Luma coded_block_pattern (CBP) may be (1920×1080)/64=32,400. If the entropy encoder utilizes an Exponential Golomb code to encode this run of symbols, the code will consist of 29 bits. In one aspect, an upper-bound on the maximum run length (MR) that is to be coded may be defined.

If the run length decoded by the decoder is greater than the defined MR, for example "MR+1," the actual run length is MR plus the additional run length decoded from the next coded sequence in the bitstream and so on. For example, FIG. 4 illustrates five different runs of lengths 402, 404, 406, 408, and 410 that are to be encoded using an Exponential Golomb code. These runs of symbols consist of three zeros 402, 13 ones 404, 14 zeros 406, 15 ones 408, and 31 zeros 410. In one configuration, the upper-bound MR that can be decoded from one coded symbol is set at the limit of 14. The run sequence of three zeros 402 may be encoded as "011." The run sequence of 13 ones 404 may be encoded as "0001101." The run of 14 zeros 406 may be encoded as "0001110." The remaining two runs of 15 ones 408 and 31 zeros 410 are greater than the upper-bound MR of 14. In one configuration, the run length of 15 ones 408 is coded as two Exponential Golomb codes, "0001111 1." The run length decoded from the first code, "0001111" is 15. However, the upper-bound MR is defined as 14. The decoded value of 15 implies that the current run length is at least 14 and that additional Exponential Golomb code should be decoded in order to obtain the actual run length. The additional run length decoded from the next code is 1. After decoding, the actual run length is MR, or 14, plus any additional decoded run lengths, such as 1. As such the decoded run length is 15.

As a further example, consider the run sequence of 31 zeros 410 to be encoded. The run length of 31 zeros 410 is coded into three Exponential Golomb codes, "0001111 0001111 011." The run length decoded from the first code is 15. Since the upper-bound MR is defined as 14, the decoded value of 15 implies that the actual run length is at least 14 and that additional Exponential Golomb code should be decoded and then added to the previously decoded run length. The run length decoded from the second code is also 15, which implies that the actual run length is at least 28 (14+14) and that additional Exponential Golomb code should be decoded and then added to the previously decoded run lengths. The run length decoded from the third code is 3. Since this is below the upper-bound MR of 14, the decoding of this run sequence is terminated. The decoded run lengths are then added together (14+14+3) to reproduce a run sequence of 31 zeros.

Figure 5:
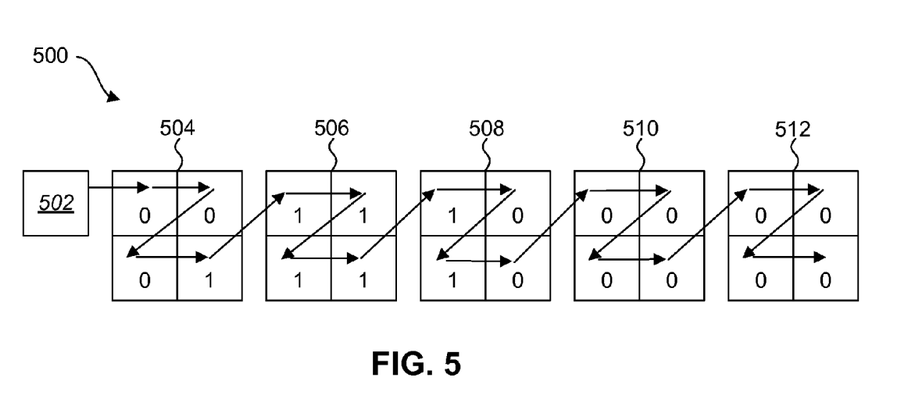
FIG. 5 is a block diagram illustrating one configuration of encoding a specific type of syntax element.

FIG. 5 is a block diagram illustrating one configuration 500 of encoding a specific type of syntax element, coded_block_pattern (CBP), utilizing the Alternating Run Length coding method as described in FIGS. 1 and 2. While several of the following figures and descriptions address the encoding of the CBP syntax element, the present systems and methods are not meant to be limited to only the encoding and decoding of such syntax elements.

As explained previously, the CBP syntax element identifies which 8×8 blocks (luma and chroma) contain coded nonzero transform coefficients. FIG. 5 illustrates five separate 16×16 luma blocks in five macroblocks 504, 506, 508, 510, and 512. Each 16×16 luma block is further partitioned into 4 8×8 luma blocks. Each 8×8 luma block may or may not contain coded nonzero transform coefficients. Because of the neighboring correlation, luma CBP bits of the neighboring 8×8 blocks are often of the same value. In the depicted configuration, an entropy encoder is used to encode the run sequences of symbols indicating whether or not an 8×8 luma block contains coded transform coefficients. In one configuration, a symbol of "0" indicates that the particular 8×8 luma block does not contain coded transform coefficients, while a symbol of "1" indicates that the luma block may contain coded nonzero transform coefficients. In one aspect, the entropy encoder encodes the run of symbols using Exponential Golomb code.

As depicted in FIG. 5, the entropy encoder encodes run sequences of symbols through a zig-zag type pattern. The first three 8×8 luma blocks of the macroblock 504 contain the symbol "0" to indicate that these blocks do not contain coded transform coefficients. The entropy encoder encodes the run "3" using the Exponential Golomb code resulting in the code "011" being added to the bitstream. The fourth 8×8 luma block of the first 16×16 macroblock 504 contains the symbol "1" to indicate that the 8×8 luma block may contain coded nonzero transform coefficients. As illustrated all four 8×8 luma blocks of macroblock 506 and the first 8×8 luma block of macroblock 508 contain the symbol "1." The entropy encoder encodes the run "6" using the Exponential Golomb code as "00110" and this code is then added to the bitstream. The run "6" is encoded because a consecutive run of ones exists through six 8×8 luma blocks using the zig-zag pattern. The entropy encoder continues to encode the symbols in the remaining 8×8 luma blocks of macroblock 508. The run sequences consist of one 8×8 luma block with the symbol "0" being encoded as "1," one 8×8 block with the symbol "1" being encoded as "1." The last 8×8 luma block of macroblock 508 as well as the remaining eight 8×8 luma blocks of macroblocks 510 and 512 all contain the symbol "0." Thus, there is a run sequence of 9 8×8 luma blocks with the symbol "0." The entropy encoder encodes the run "9" using the Exponential Golomb code as "0001001."

After the entropy encoder has encoded luma CBP of the five illustrated macroblocks, the following bitstream is sent to the decoder "1 011 00110 1 1 0001001." The first value of "1" in the bitstream represents an initial luma CBP bit 502, which is a 1-bit flag of value 1. In one configuration, the initial CBP 502 value is the inverse of the value of the symbols in the first run sequence to be decoded.

The decoding process of the bitstream encoded in FIG. 5 begins with the decoder reading the initial CBP 502 value from the bitstream. This initial value will help the encoder derive the value of the symbols in the first run sequence. The next code decoded is "011" which indicates a run length of three CBP bits in the scanning order are zero. The following code decoded is "00110" which indicates a run length of six CBP bits in the scanning order are "1," and so on.

Figure 6:
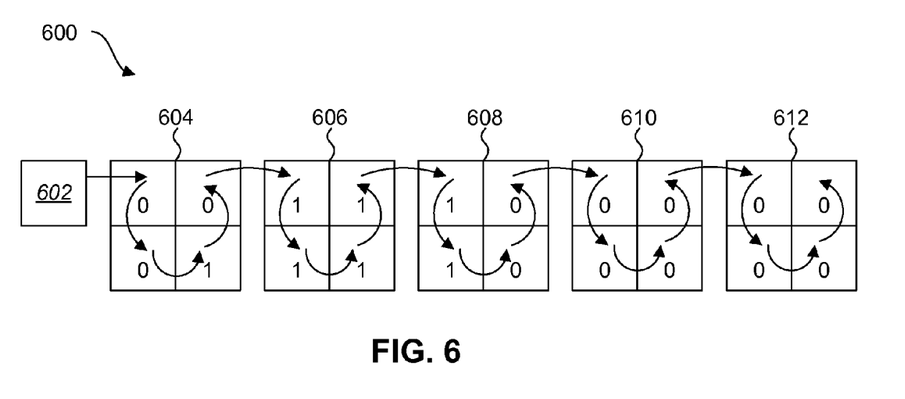
FIG. 6 is a block diagram illustrating an additional aspect of encoding a specific type of syntax element.

FIG. 6 is a block diagram illustrating another configuration 600 of scanning the CBP bits within a plurality of macroblocks 604, 606, 608, 610, and 612. The entropy encoder encodes the run sequences in the same manner as that described in FIG. 5, but the entropy encoder may scan the macroblocks differently so that the distance from one 8×8 block to another is minimal in order to statistically increase the run length and reduce the number of runs to be coded. An initial value 602 is also encoded and added to the bitstream to indicate the value of the first run sequence.

Figure 7:
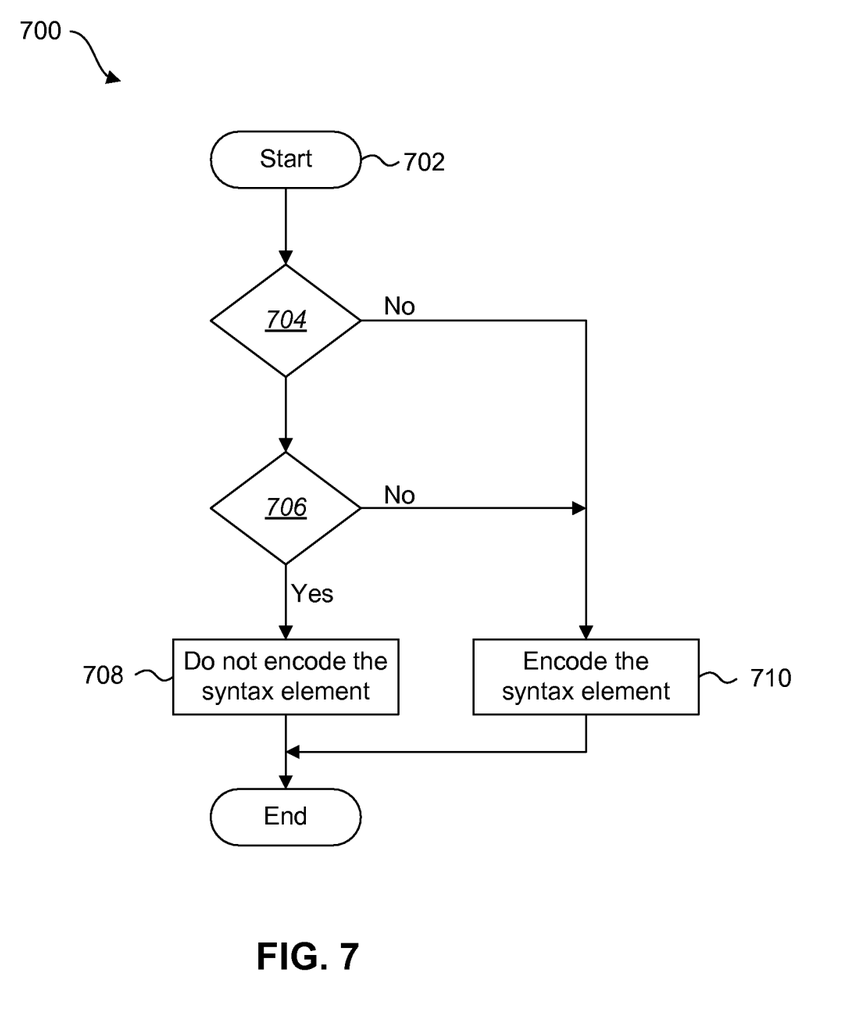
FIG. 7 is a flow chart diagram illustrating one configuration of a method to code luma coded block pattern (CBP) bits in an enhancement layer.

FIG. 7 is a flow chart diagram illustrating one configuration of a method 700 to code luma CBP in an enhancement layer, such as a SNR enhancement layer. In the following discussion, SNR enhancement layer can be either an FGS SNR layer or a coarse granularity SNR layer. If the luma CBP to be coded is in the SNR enhancement layer, the CBP in the enhancement layer has a strong correlation with the CBP in the base layer. The method 700 illustrated in FIG. 7 indicates whether or not the luma CBP in the enhancement layer is to be coded.

The method starts 702 and determines 704 if the corresponding 8×8 block in the base layer to the current 8×8 block in the enhancement layer has nonzero transform coefficients. If the corresponding 8×8 block in the base layer has the symbol of "1," indicating the presence of nonzero coefficients, the method continues to determine 706 if the current 8×8 block in the enhancement layer is further coded as four sub-blocks. If the current 8×8 block in the enhancement layer is further coded into four sub-blocks, the luma CBP bit of the current 8×8 block is not coded 708. Otherwise, if either of the two conditions provided 704, 706 are not met, the luma CBP bit of the current 8×8 block is explicitly encoded 710.

An 8×8 block in the base layer may contain the symbol "1" indicating that the 8×8 block in the base layer has nonzero coefficients. If the luma CBP bit in the SNR enhancement layer is not encoded and inferred to have the value "1," one bit is saved because this value did not have to be explicitly encoded. However, if the actual value of the luma CBP in the enhancement layer is "0," the mis-prediction of the value of the luma CBP in the enhancement layer may be corrected at the lower syntax level. If the 8×8 block in the enhancement layer is coded as four sub-blocks for each sub-block additional syntax elements are coded in the bitstream to indicate whether there are any nonzero coefficients in the sub-block. The mis-prediction of the luma CBP bit in the enhancement layer at the 8×8 block level may be corrected at the sub-block level with relatively small overhead. The additional constraint illustrated by the method 700 in FIG. 7 requires the corresponding 8×8 block in the base layer to have a luma CBP bit indicating nonzero coefficients as well as the 8×8 block in the enhancement layer to be coded as four sub-blocks before the 8×8 block CBP bit in the enhancement layer is not encoded.

In one configuration, the Alternating Run Length coding is applied to those enhancement layer luma CBP bits where either their corresponding luma CBP bits in the base layer are zero or the enhancement layer luma CBP bits must be explicitly encoded because the 8×8 block is not coded as four sub-blocks. In one configuration, the luma CBP bits in the enhancement layer that are to be encoded may be coded in two separate scans. In one system of coding the luma CBP in the FGS layer, a luma CBP bit whose corresponding luma CBP bit in the base layer is 0 is referred to as Type-0 luma CBP bits, and a luma CBP bit whose corresponding luma CBP bit in the base layer is 1 is referred to as Type-1 luma CBP bit. In each scan, one type of luma CBP bits are coded using Alternating Run Length coding. The two scans may be done sequentially, or they may be performed simultaneously. In another configuration, the base layer CBP information is ignored in coding the luma CBP in the enhancement layer.

Figure 8:
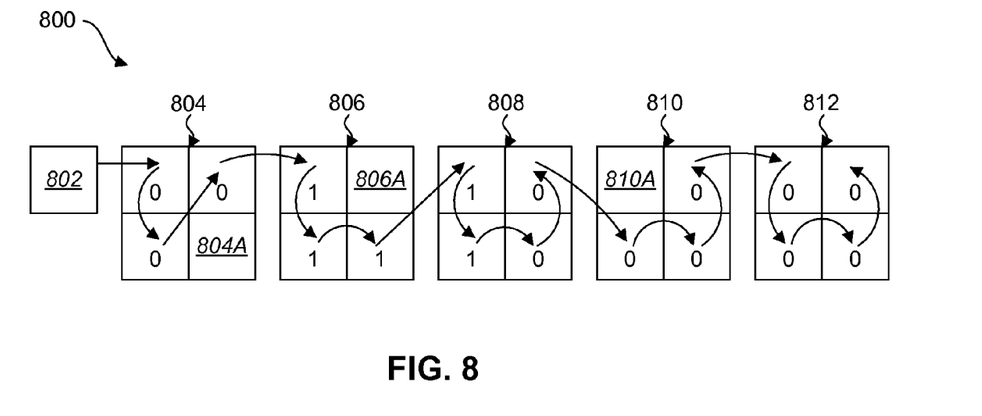
FIG. 8 is a block diagram illustrating one configuration of the method described in accordance with FIG. 7.

FIG. 8 is a block diagram illustrating one configuration 800 of the method 700 described in accordance with FIG. 7. As illustrated, five 16×16 luma blocks in macroblocks 804, 806, 808, 810, and 812 in the SNR enhancement layer are encoded by an entropy encoder. In one configuration, the entropy encoder encodes luma CBP bits for each 8×8 block in the macroblocks. As depicted, three 8×8 blocks in the first macroblock 804 have the symbol "0" indicating there are no nonzero coefficients in these 8×8 blocks. The fourth 8×8 block 804A in the first macroblock 804 corresponds to an 8×8 block in the base layer that has the symbol "1" indicating the presence of nonzero coefficients. In one configuration, the fourth 8×8 block 804A is also further coded into sub-blocks (not shown). As illustrated, the entropy encoder bypasses this fourth 8×8 block 804A and does not explicitly encode the luma CBP bit associated with this fourth 8×8 block 804A. The luma CBP bit is inferred to have the symbol "1" because the corresponding 8×8 block in the base layer has the CBP bit of "1" and the 8×8 block 804A is further partitioned into sub-blocks. In one configuration, the entropy encoder encodes the run sequence of three zeros using the Exponential Golomb code as "011" and includes this in the bitstream.

The entropy encoder further scans the second 16×16 luma block in macroblock 806. Three of the four 8×8 blocks possess the symbol "1" indicating the presence of nonzero coefficients. The fourth 8×8 block 806A corresponds to an 8×8 block in the base layer that has the symbol "1" indicating the presence of nonzero coefficients in the base layer. In one configuration, this fourth 8×8 block 806A is further coded into sub-blocks (not shown). The entropy encoder bypasses this fourth 8×8 block 806A and does not explicitly encode the luma CBP associated with such block. The entropy encoder continues in a similar manner scanning the remaining 8×8 blocks within the macroblocks, bypassing an 8×8 block 810A that is further coded as sub-blocks and whose corresponding 8×8 block in the base layer has a symbol "1." The following bitstream is sent to the decoder, "1 011 00101 0001001" with the initial bit 802 being set to "1," the inverse of the value of the first coded luma CBP bit.

Figure 9:
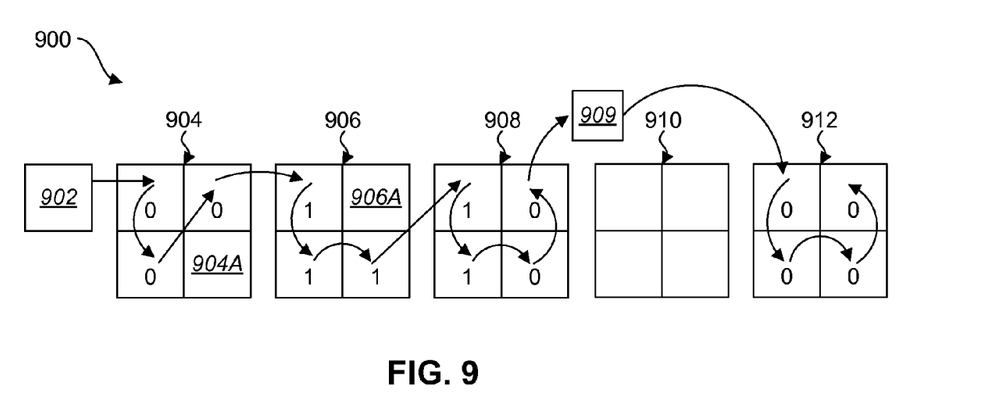
FIG. 9 is a block diagram illustrating an additional configuration of the Alternative Run Length coding in an enhancement layer.

FIG. 9 is a block diagram illustrating one configuration 900 of utilizing Alternative Run Length coding in an enhancement layer in which mb_skip_flag bit is defined and bypassing the encoding of a complete macroblock 910. The first three 16×16 luma blocks in macroblocks 904, 906, and 908 illustrated in FIG. 9 are identical to those depicted in FIG. 8. The entropy encoder scans each 8×8 block in the macroblocks and encodes the luma CBP bit value unless the 8×8 block is further coded into sub-blocks and the corresponding 8×8 block in the base layer has a value of "1." As previously explained in FIGS. 7 and 8, these 8×8 blocks 904A and 906A are bypassed and their corresponding luma CBP bits are not encoded. In one configuration, a complete 16×16 luma block in macroblock 910 may be bypassed by the entropy encoder. If the mb_skip_flag bit is defined and its value is 1, the encoder skips the current macroblock. If a macroblock is skipped, both the luma CBP and chroma CBP bits are inferred to be zero. In one configuration, the entropy encoder scans the mb_skip_flag 909 that indicates the current macroblock is to be skipped completely. In the following diagram, when the entropy encoder completes the scan of luma CBP bits associated with the third macroblock 908, the encoder skips the fourth macroblock 910 and continues to scan the luma CBP bits of the fifth macroblock 912. The resulting bitstream related to Luma CBP is "1 011 00101 00110" with the initial CBP bit 902 being a "1," the inverse of the value of the luma CBP bit coded in the first run. This bitstream may be interleaved with the bitstream formed from other syntax elements before it is sent to the decoder.

As explained, the mb_skip_flag may be used in coding of the enhancement layer, which could be a coarse granularity enhancement layer or Fine Granularity SNR enhancement layer. If the slice in the enhancement layer is not intra-predicted. In non-scalable video coding, an intra-predicted slice is a slice that is predicted based on samples within the current slice. In scalable video coding, intra-predicted slice in the enhancement layer may be so defined that the prediction can be constructed from the samples in the corresponding frame in the base layer. When Variable Length Coding (VLC) is used as the entropy coding method, the mb_skip_flag's are coded as mb_skip_run's using the same method as that defined in the H.264/AVC standards. In another aspect, the mb_skip_flag is coded using Alternating Run Length coding as it has been previously explained.

Figure 10:
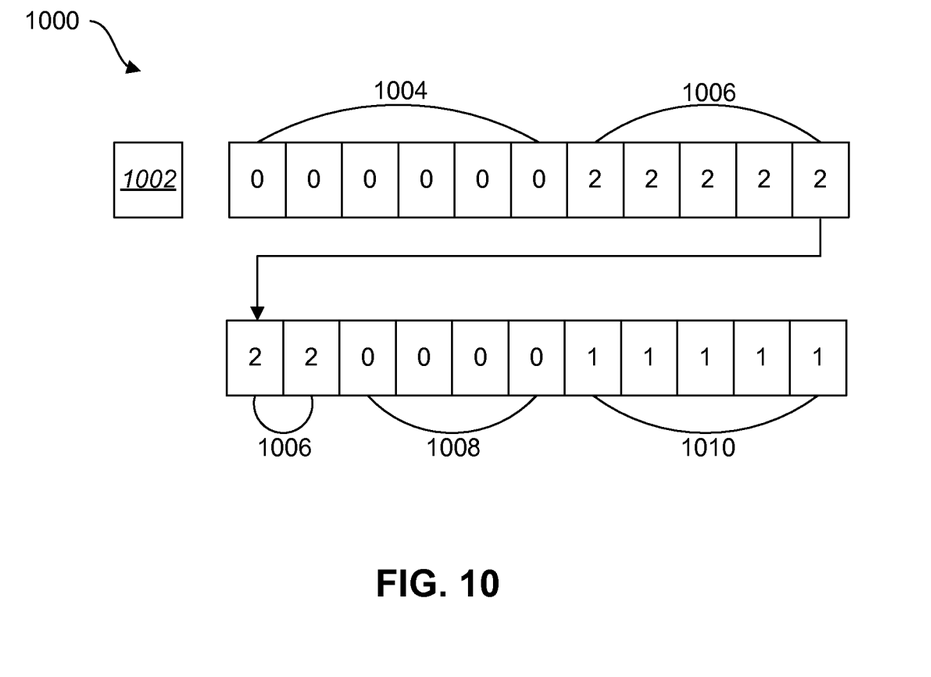
FIG. 10 is a block diagram illustrating an additional aspect of coding chroma CBP using the Alternating Run Length coding.

FIG. 10 is a block diagram illustrating one configuration 1000 of coding chroma coded block patterns using Alternating Run Length coding and transition flags. The block diagram of FIG. 10 may also be utilized to code additional syntax elements related to chroma blocks as explained previously. Unlike luma CBP which consists of 4 binary symbols, chroma CBP may have a value in the range from 0 to 2. In H.264/AVC and its SVC extensions, a single chroma CBP is defined for both Cb and Cr blocks. In the following discussion, a chroma block refers to both Cb and Cr blocks unless indicated otherwise. The same schemes described may be extended to code the chroma CBP with a different definition. Since there are only three possible values for chroma CBP, a specific chroma CBP can only change from one value to one of the other two values. For example, if the current chroma CBP value is 1, at the end of the run sequence, the chroma CBP value of the next run must only be 0 or 2. In one configuration, a one-bit transition flag signals the value of the new chroma CBP.

As illustrated, the first six chroma blocks 1004 have the chroma CBP values of 0, the following seven chroma blocks 1006 have the value 2, the following four chroma blocks 1008 have the value 0, and the remaining five chroma blocks 1010 have the value 1. In one configuration, the entropy encoder codes these values using the Exponential Golomb code. The first run of six zeros 1004 is encoded as "00110." The run sequence of seven blocks 1006 with value 2 is encoded as "00111." A one-bit transition flag (not shown) is inserted between these two encoded runs. In one configuration, the transition flag may be assigned the value of 0 or 1 to indicate the chroma CBP value in the next encoded chroma CBP run sequence. For example, the transition flag of value 1 may be inserted after the run of chroma CBP with the value of zero to indicate the next run of chroma CBP has the value of 2. Following the run with seven consecutive blocks 1006, the entropy encoder encodes the run of four zeros 1008 as well as the run of five ones 1010. A transition flag of value 1 may be inserted in the bitstream after the run of chroma CBP of value two 1006 to indicate the next run of chroma CBP 1008 has the value of 0 and so on. A transition flag of value 0 may be inserted in the bitstream after the run of chroma CBP of value zero 1008 to indicate the next run of chroma CBP 1010 has the value of one. In one configuration, the decoder derives the new chroma CBP value from the last chroma CBP and the transition flag as follows: newchromaCbp=(lastchromaCbp+transitionflag+1) % 3.

The transition flag may be defined in different ways. In one configuration, the transition flag may be retrieved from a lookup table which is indexed by the lastchromaCbp and newchromaCbp in the encoder. In the decoder, a matching lookup table is defined which can be used to derive newchromaCbp from the lastchromaCbp and the transition flag. An initial value is stored in the bitstream before any other information related to the chroma CBP is coded to help derive the value of the Chroma CBP in the first run.

In an additional aspect, the run of chroma CBP of value 1 and run of chroma CBP of value 2 are not differentiated. The runs of zero chroma CBP and runs of nonzero chroma CBP are coded. After each run, assuming the run-length is "n," of nonzero chroma CBP is decoded, "n" additional bits are decoded to identify whether each of the "n" chroma CBP values is 1 or 2. An initial value is stored in the bitstream before any other information related to the chroma CBP is coded. The value of 0 is used as the initial value if the first chroma CBP to be coded using Alternating Run Length coding is nonzero. Otherwise, the value of 1 is used as the initial value.

In a further aspect, the runs of chroma CBP may be coded following the Zero Runs coding scheme described in FIG. 3. The run of zeros before a nonzero chroma CBP may be coded using the Exponential Golomb code. An additional one-bit flag is coded to indicate whether the nonzero chroma CBP value is 1 or 2. This feature differs from the previously described configurations in that consecutive nonzero chroma CBP values are not grouped together.

FIG. 11 illustrates a device 1100 configured to process digital images and/or digital video. The device 1100 may represent or be implemented in a digital television, a digital direct broadcast system, a wireless communication device, a personal digital assistant (PDA), a laptop computer, a desktop computer, a digital camera, a digital recording device, a network-enabled digital television, a cellular or satellite radio telephone, or any telecommunication device with video telephony (VT) capabilities.

The device 1100 may process, encode, decode, transmit and/or receive image and/or video data. The video data may be captured by a video camera, such as a video capture unit (or image sensor) 1112, retrieved from a video archive, or obtained in another manner. A video coding unit 1110 in the device 1100 may use a video coding standard such as MPEG-4, ITU-T H.263, ITU-T H.264, or any other video coding standard. The video coding unit 1110 may support inter-frame coding techniques, such as motion estimation and motion compensation, and intra-frame coding techniques, such as spatial estimation and intra-prediction coding techniques.

The device 1100 may include an image/video capture device 1112, such as a camera or video camera, to capture images or video sequences and store the captured images or sequences in a memory 1114. An image/video processing unit 1102 may process images and/or video sequences. The memory 1104 may store the images and/or video sequences before and after such processing.

A transceiver 1116 may receive and/or transmit coded video sequences to another device. The transceiver 1116 may use a wireless communication standard such as code division multiple access (CDMA). Examples of CDMA standards include CDMA 1xEV-DO, Wideband Code Division Multiple Access (WCDMA), etc.

One or more elements of the device 1100 may be communicatively coupled via a communication bus 1118. In addition to or instead of the elements shown in FIG. 1, other elements may be included in the device 1100. The architecture illustrated in FIG. 1 is merely an example. The techniques described herein may be implemented with a variety of other architectures.

The memory 1114 may have a relatively large memory space. The memory 1114 may comprise dynamic random access memory (DRAM), or FLASH memory. The memory 1114 may comprise "NOR" or "NAND" gate memory technology, or any other data storage technology. In other examples, the memory 1114 may comprise a non-volatile memory or any other type of data storage unit.

The image/video processing unit 1102 may comprise a chip set for a mobile radiotelephone or other mobile device, which may include hardware, software, firmware, and/or one or more microprocessors, digital signal processors (DSPs), application specific integrated circuits (ASICs), field programmable gate arrays (FPGAs), or various combinations thereof. The processing unit 1102 may include a local memory 1104 coupled to a front-end image/video processing unit 1108 and an image/video coding unit 1119. The coding unit 1119 may comprise an encoder/decoder (CODEC) for encoding (or compressing) and decoding (or decompressing) digital video data.

The local memory 1104 may comprise a smaller and faster memory space relative to the memory 1114. For example, the local memory 1104 may comprise synchronous dynamic random access memory (SDRAM). The local memory 1104 may comprise "on-chip" memory integrated with the other components of the processing unit 1102 to provide fast access to data during a processor-intensive coding process. However, the memories 1114 and 1104 may be combined into one memory, or may be implemented in a number of other configurations. A memory controller 1106 may control memory fetches and write-backs to the local memory 1104.

The front-end image/video processing unit 1108 may perform one or more image processing techniques on the frames of a video sequence to improve image quality, and thereby improve the quality of a video sequence. For example, the front-end image/video processing unit 1108 may perform techniques such as demosaicing, lens rolloff correction, scaling, color correction, color conversion, and spatial filtering. The front-end image/video processing unit 1108 may also perform other techniques. In general, the techniques performed by the unit 1108 are referred to as "front-end" image processing techniques because the techniques precede coding by the image/video coding unit 1110.

The image/video capture unit 1112 may comprise image sensors that include color filter arrays (CFAs) arranged on a surface of the sensors. Front-end image processing performed by the unit 1108 may improve the quality of the video sequence captured by the capture unit 1112. For example, the front-end processing unit 1108 and/or the coding unit 1110 may comprise a digital signal processor (DSP) programmed to process images captured by the capture unit 1112. The same area of memory 1104 (or memory 1114) may used for both front-end image processing purposes and for other storage purposes.

The image/video coding unit 1110 may perform image and/or video coding, which may include one or more video compression techniques, such as inter-frame compression and/or intra-frame compression. For example, the coding unit 1110 may implement motion estimation and motion compensation techniques to exploit temporal or inter-frame data correlation to provide inter-frame compression. Alternatively or additionally, the coding unit 1110 may perform spatial estimation and intra-prediction techniques to exploit spatial or intra-frame data correlation to provide intra-frame compression. The output of motion compensation (or intra-prediction) is referred to as "residual," and may comprise a block of data indicative of differences between a current video block to be coded and a prediction block identified by motion estimation or spatial estimation.

After the coding unit 1110 performs motion compensation (or intra-prediction) to create the residual, a series of additional steps may be performed to further code the residual and further compress the data. The additional steps may depend on the coding standard being used, but are generally referred to as "residual coding." The coding unit 1110 may perform one or more of these video compression techniques to reduce the amount of data needed to communicate a video sequence to another device via the transceiver 1116.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present systems and methods.

The various illustrative logical blocks, modules, and circuits described in connection with the configurations disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the configurations disclosed herein may be embodied directly in hardware, in a software module executed by a processor, or in a combination of the two. A software module may reside in random access memory (RAM), flash memory, read-only memory (ROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present systems and methods. In other words, unless a specific order of steps or actions is required for proper operation of the configuration, the order and/or use of specific steps and/or actions may be modified without departing from the scope of the present systems and methods.

While specific configurations and applications of the present systems and methods have been illustrated and described, it is to be understood that the systems and methods are not limited to the precise configuration and components disclosed herein. Various modifications, changes, and variations which will be apparent to those skilled in the art may be made in the arrangement, operation, and details of the methods and systems disclosed herein without departing from the spirit and scope of the systems and methods.

What is claimed is:

1. A method of video compression, the method comprising:
   encoding macroblocks of a sequence of video frames;
   generating coded block patterns for the macroblocks, wherein the coded block patterns include bits that indicate whether different video blocks of the macroblocks include non-zero transform coefficients; and
   run-length coding the coded block patterns for the macroblocks together such that one or more runs defined in run-length coding span symbols of a plurality of different coded block patterns associated with a plurality of the macroblocks, and
   wherein the coded block patterns comprise luma coded block patterns, and wherein run-length coding the coded block patterns comprises run-length coding the luma coded block patterns together such that one or more first runs span symbols of a plurality of different luma coded block patterns associated with the plurality of the macroblocks.

2. The method of claim 1, wherein run-length coding the coded block patterns comprises coding runs of zeros and runs of nonzero values.

3. The method of claim 2, further comprising coding an initial value symbol to indicate the initial value of the coded runs of zeros and runs of nonzero values.

4. The method of claim 1, wherein run-length coding the coded block patterns comprises coding only runs of zeros.

5. The method of claim 1, further comprising inserting a transition symbol to indicate how the value of a symbol in a current run of symbols of the coded block patterns changes to the value of a symbol in a next run of symbols of the coded block patterns.

6. The method of claim 1, further comprising run-length coding macroblock skip symbols together such that one or more runs defined in run-length coding span macroblock skip symbols for the plurality of the macroblocks.

7. The method of claim 1, further comprising run-length coding macroblock type symbols together such that one or more runs defined in run-length coding span macroblock type symbols for the plurality of the macroblocks.

8. The method of claim 1, further comprising run-length coding delta quantization parameter symbols together such that one or more runs defined in run-length coding span delta quantization symbols for the plurality of the macroblocks.

9. The method of claim 1, further comprising defining a maximum run length for the symbols of the coded block patterns that are coded together.

10. The method of claim 1, further comprising scanning the symbols of the coded block patterns in multiple patterns.

11. The method of claim 1, further comprising defining a skip flag bit and bypassing coding of a set of macroblocks based on the skip flag bit.

12. The method of claim 11, further comprising defining the skip flag bit in an enhancement layer.

13. The method of claim 1, further comprising coding the symbols of the coded block patterns together within an enhancement layer based upon corresponding symbols of the coded block patterns within a base layer.

14. The method of claim 1, wherein the coded block patterns comprise chroma coded block patterns, and wherein run-length coding the coded block patterns comprises run-length coding the chroma coded block patterns together such that one or more runs span symbols of a plurality of different chroma coded block patterns associated with the plurality of the macroblocks.

15. The method of claim 1, wherein the luma coded block patterns comprise base layer coded block patterns and enhancement layer coded block patterns, and wherein run-length coding the luma coded block patterns comprises:
   run-length coding the base layer coded block patterns together such that one or more runs span symbols of a plurality of different base layer coded block patterns associated with the plurality of the macroblocks; and
   run-length coding the enhancement layer coded block patterns together such that one or more runs span symbols of a plurality of different enhancement layer coded block patterns associated with the plurality of the macroblocks, wherein at least one symbol of the enhancement layer coded block patterns is bypassed when a corresponding symbol of the base layer coded block patterns indicates that a video block of a macroblock includes non-zero transform coefficients and the video block is further coded into sub-blocks in the enhancement layer.

16. An apparatus that performs video compression, the apparatus comprising:
a processor;
memory in electronic communication with the processor; and
instructions stored in the memory, the instructions being executable to:
encode macroblocks of a sequence of video frames;
generate coded block patterns for the macroblocks, wherein the coded block patterns include bits that indicate whether different video blocks of the macroblocks include non-zero transform coefficients; and
run-length code the coded block patterns for the macroblocks together such that one or more runs defined in run-length coding span symbols of a plurality of different coded block patterns associated with a plurality of the macroblocks, and
wherein the coded block patterns comprise luma coded block patterns, and wherein run-length coding the coded block patterns comprises run-length coding the luma coded block patterns together such that one or more first runs span symbols of a plurality of different luma coded block patterns associated with the plurality of the macroblocks.

17. The apparatus of claim 16, wherein the run-length coded block patterns comprise runs of zeros and runs of nonzero values.

18. The apparatus of claim 16, wherein the coded block patterns comprise chroma coded block patterns, and wherein the processor run-length codes the chroma coded block patterns together such that one or more runs span symbols of a plurality of different chroma coded block patterns associated with the plurality of the macroblocks.

19. The apparatus of claim 16, wherein the luma coded block patterns comprise base layer coded block patterns and enhancement layer coded block patterns, and the processor:
run-length codes the base layer coded block patterns together such that one or more runs span symbols of a plurality of different base layer coded block patterns associated with the plurality of the macroblocks; and
run-length codes the enhancement layer coded block patterns together such that one or more runs span symbols of a plurality of different enhancement layer coded block patterns associated with the plurality of the macroblocks, wherein at least one symbol of the enhancement layer coded block patterns is bypassed when a corresponding symbol of the base layer coded block patterns indicates that a video block of a macroblock includes non-zero transform coefficients and the video block is further coded into sub-blocks in the enhancement layer.

20. A non-transitory computer-readable medium comprising executable instructions for performing video compression, wherein the instructions cause one or more processors to:
encode macroblocks of a sequence of video frames;
generate coded block patterns for the macroblocks, wherein the coded block patterns include bits that indicate whether different video blocks of the macroblocks include non-zero transform coefficients; and
run-length code the coded block patterns for the macroblocks together such that one or more runs defined in run-length coding span symbols of a plurality of different coded block patterns associated with a plurality of the macroblocks, and
wherein the coded block patterns comprise luma coded block patterns, and wherein run-length coding the coded block patterns comprises run-length coding the luma coded block patterns together such that one or more first runs span symbols of a plurality of different luma coded block patterns associated with the plurality of the macroblocks.

21. The non-transitory computer-readable medium of claim 20, wherein the run-length coded block patterns comprise runs of zeros and runs of nonzero values.

22. An apparatus that is configured to perform video compression, the apparatus comprising:
means for encoding macroblocks of a sequence of video frames;
means for generating coded block patterns for the macroblocks, wherein the coded block patterns include bits that indicate whether different video blocks of the macroblocks include non-zero transform coefficients; and
means for run-length coding the coded block patterns for the macroblocks together such that one or more runs defined in run-length coding span symbols of a plurality of different coded block patterns associated with a plurality of the macroblocks, and
wherein the coded block patterns comprise luma coded block patterns, and wherein run-length coding the coded block patterns comprises run-length coding the luma coded block patterns together such that one or more first runs span symbols of a plurality of different luma coded block patterns associated with the plurality of the macroblocks.

23. A method of video compression, the method comprising:
encoding macroblocks of a sequence of video frames;
generating coded block patterns for the macroblocks, wherein the coded block patterns include bits that indicate whether different video blocks of the macroblocks include non-zero transform coefficients, and wherein the coded block patterns comprise base layer coded block patterns and enhancement layer coded block patterns for the macroblocks; and
run-length coding the coded block patterns for the macroblocks together such that one or more runs defined in the run-length coding span symbols of a plurality of the coded block patterns associated with a plurality of the macroblocks, wherein run-length coding the coded block patterns comprises:
run-length coding the base layer coded block patterns together such that one or more runs span symbols of a plurality of different base layer coded block patterns associated with the plurality of the macroblocks; and
run-length coding the enhancement layer coded block patterns together such that one or more runs span symbols of a plurality of different enhancement layer coded block patterns associated with the plurality of the macroblocks, wherein at least one symbol of the enhancement layer coded block patterns is bypassed when a corresponding symbol of the base layer coded block patterns indicates that a video block of a macroblock includes non-zero transform coefficients and the video block is further coded into sub-blocks in the enhancement layer.

24. The method of claim 23, wherein the coded block patterns comprise luma coded block patterns, and wherein run-length coding each of the base layer coded block patterns and enhancement layer coded block patterns comprises run-length coding the luma coded block patterns together such that one or more runs span symbols of a plurality of different luma coded block patterns associated with the plurality of the macroblocks.

25. An apparatus that performs video compression, the apparatus comprising:
   a processor;
   memory in electronic communication with the processor;
   instructions stored in the memory, wherein execution of the instructions causes the processor to:
      encode macroblocks of a sequence of video frames;
      generate coded block patterns for the macroblocks, wherein the coded block patterns include bits that indicate whether different video blocks of the macroblocks include non-zero transform coefficients, and wherein the coded block patterns comprise base layer coded block patterns and enhancement layer coded block patterns; and
      run-length code the coded block patterns for the macroblocks together such that one or more runs defined in the run-length coding span symbols of a plurality of the coded block patterns associated with a plurality of the macroblocks, and wherein the processor:
         run-length codes the base layer coded block patterns together such that one or more runs span symbols of a plurality of different base layer coded block patterns associated with the plurality of the macroblocks; and
         run-length codes the enhancement layer coded block patterns together such that one or more runs span symbols of a plurality of different enhancement layer coded block patterns associated with the plurality of the macroblocks, wherein at least one symbol of the enhancement layer coded block patterns is bypassed when a corresponding symbol of the base layer coded block patterns indicates that a video block of a macroblock includes non-zero transform coefficients and the video block is further coded into sub-blocks in the enhancement layer.

26. The apparatus of claim 25, wherein the coded block patterns comprise luma coded block patterns, and wherein the processor run-length codes the luma coded block patterns together such that one or more runs span symbols of a plurality of different luma coded block patterns associated with the plurality of the macroblocks in order to run-length code each of the base layer coded block patterns and enhancement layer coded block patterns.

* * * * *